United States Patent

Koma

Patent Number: 5,206,904
Date of Patent: Apr. 27, 1993

[54] APPARATUS FOR DRIVING A SERVICE FUNCTION UNIT OF A MULTI-FUNCTION TELEPHONE SET

[75] Inventor: Noriko Koma, Tokyo, Japan

[73] Assignee: NEC Corporation, Tokyo, Japan

[21] Appl. No.: 630,571

[22] Filed: Dec. 20, 1990

[30] Foreign Application Priority Data

Dec. 20, 1989 [JP] Japan ................................. 1-330154

[51] Int. Cl.⁵ .............................................. H04M 1/26
[52] U.S. Cl. .................................. 379/355; 379/354; 340/717
[58] Field of Search ............... 379/354, 355, 356, 216; 340/717

[56] References Cited

U.S. PATENT DOCUMENTS

| | | | |
|---|---|---|---|
| 4,011,414 | 3/1977 | Warren | 379/355 |
| 4,243,845 | 1/1981 | Feinberg et al. | 379/355 |
| 4,453,040 | 6/1984 | Wolf et al. | 379/355 |
| 4,511,764 | 4/1985 | Nakayama et al. | 379/354 |
| 4,585,908 | 4/1986 | Smith . | |
| 4,709,387 | 11/1987 | Masuda | 379/356 |
| 4,736,410 | 4/1988 | Nishida et al. | 379/354 |
| 4,788,720 | 11/1988 | Brennan et al. . | |
| 4,827,398 | 5/1989 | Lamiaux . | |
| 4,839,919 | 6/1989 | Borges et al. | 379/354 |
| 4,939,509 | 7/1990 | Bartholomew et al. | 340/717 |
| 4,974,173 | 11/1990 | Stefik et al. | 340/717 |
| 5,034,976 | 7/1991 | Sato | 379/355 |

FOREIGN PATENT DOCUMENTS

| | | |
|---|---|---|
| 8911195 | 11/1989 | European Pat. Off. . |
| 3220734 | 12/1983 | Fed. Rep. of Germany . |
| 0098201 | 1/1984 | France . |
| 59-62263 | 4/1984 | Japan . |

Primary Examiner—James L. Dwyer
Assistant Examiner—M. Shehata
Attorney, Agent, or Firm—Sughrue, Mion, Zinn, Macpeak & Seas

[57] ABSTRACT

In an apparatus for driving a service function unit of a multi-function telephone set, each service function is carried out by pushing one hardware type programmable key. The pushing of the programmable key is to read programmed service information stored in a memory, and to process the read service information, so that the service function is easily carried out by a single key operation by a user of the telephone set.

8 Claims, 6 Drawing Sheets

EEPROM (NON-VOLATILE MEMORY) 6

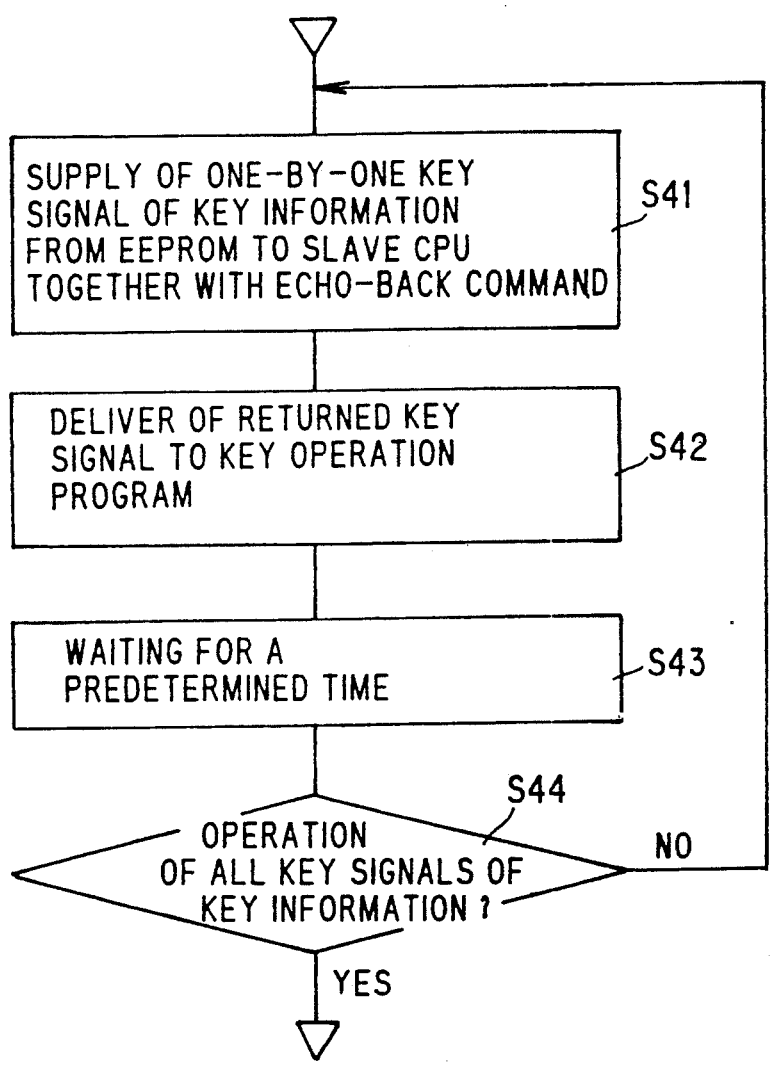

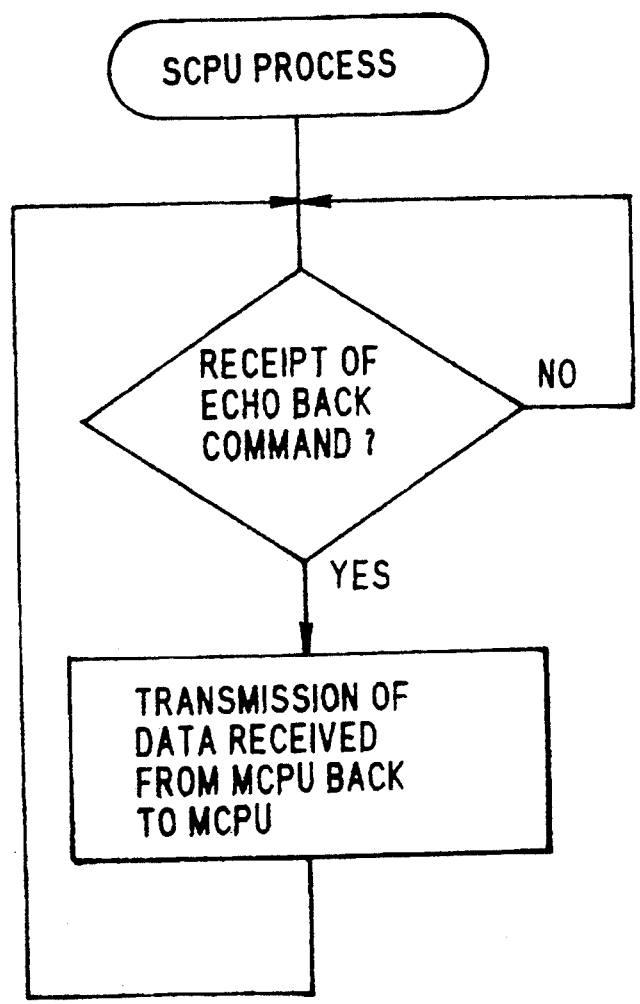

APPARATUS FOR DRIVING A SERVICE FUNCTION UNIT OF A MULTI-FUNCTION TELEPHONE SET

FIELD OF THE INVENTION

This invention relates to an apparatus for driving a service function unit of a multi-function telephone set, and more particularly to, an apparatus for driving a service function unit of a multi-function telephone set in which a service function unit is driven by key operation of the telephone set.

BACKGROUND OF THE INVENTION

A conventional apparatus for driving a service function unit of a multi-function telephone set comprises a key operation unit including dial keys of 0 to 9 and at least one function key, a controlling unit such as a microprocessor, and a memory.

In operation, when a plurality of keys which are in a predetermined order including the function key are pushed in the key operation unit to supply key information to the controlling unit, the controlling unit decodes the key information to drive the service function unit to operate a corresponding function. For instance, when the dial key "9" is pushed twice and then the function key "SEND" is pushed to produce key information "9, 9, SEND", the controlling unit decodes the key information to identify as information of a shortened dial call, so that a certain phone number, which is registered beforehand at a corresponding address of a registering area in the memory of the telephone set, is called up. On the other hand, when the function key "FNC" is pushed and then the dial key "1" is pushed twice to produce key information "FNC, 1, 1", the controlling unit decodes the key information to identify as information of a calling time displaying function, and the time is displayed. Other functions are instructed to be carried out in the similar key operation as explained above.

According to the conventional apparatus for driving a service function unit of a multi-function telephone set, however, there is a disadvantage in that predetermined keys must be pushed in order, for instance, three times to instruct the service functions, because the number of keys which can be disposed on a limited area of the front panel of the telephone set is limited. As a result, a user of the telephone set may be reluctant to use such a service function.

SUMMARY OF THE INVENTION

Accordingly, it is an object of the invention to provide an apparatus for driving a service function unit of a multi-function telephone set in which a service function which is routinely used is driven by a simple sequence of key operations.

According to a feature of the invention, an apparatus for driving a service function unit of a multi-function telephone set comprises:

a memory for storing service information generated by pushing a plurality of keys;

at least one programmable key for reading the service information from the memory; and means for controlling the service function unit to be driven in accordance with the service information which is read from the memory by the programmable key.

BRIEF DESCRIPTION OF THE DRAWINGS

The invention will be described in more detail in conjunction with appended drawings, wherein:

FIG. 5 is a flow chart explaining operation S4 in FIG. 5 in the preferred embodiment according to the invention; and FIGS. 6A to 6D are a block diagram, transmitting data formats, and a flow chart explaining a relation between master and slave CPU in the apparatus in the preferred embodiment according to the invention.

DESCRIPTION OF THE PREFERRED EMBODIMENTS

Figure 1:
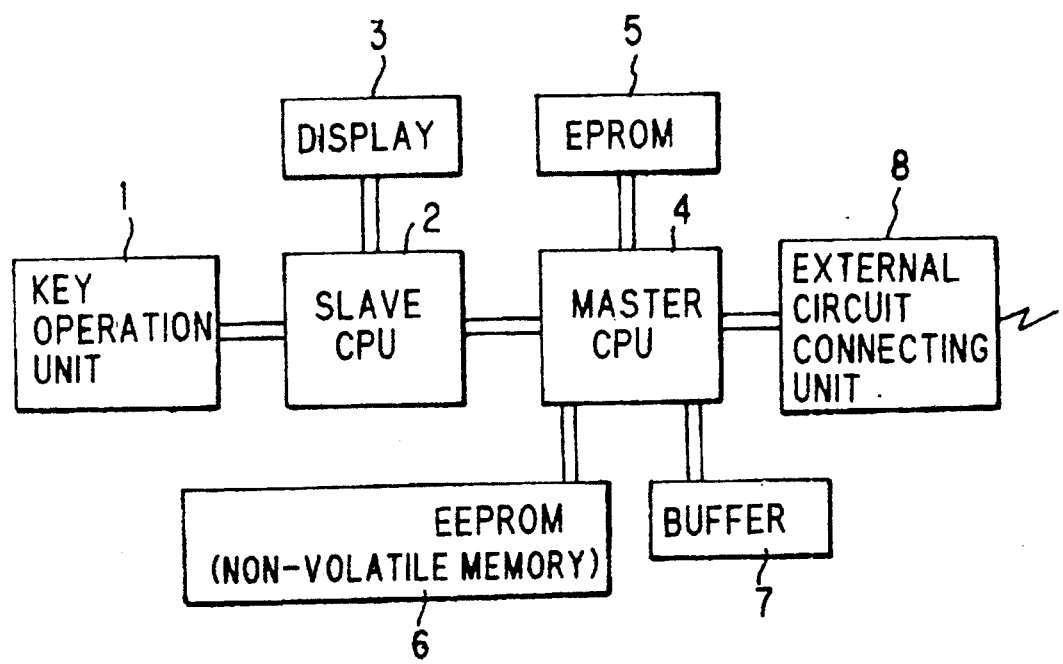
FIG. 1 is a circuitry block diagram showing the apparatus for driving a service function unit of a multi-function telephone set in the preferred embodiment according to the invention.

FIG. 1 is a block diagram showing an apparatus for driving a service function unit of a multi-function telephone set in a preferred embodiment according to the invention. The apparatus comprises a key operation unit 1, a slave CPU 2, a display 3, a master CPU 4, an EPROM 5, an EEPROM (non-volatile memory) 6, a buffer 7, and an external circuit connecting unit 8. The slave CPU 2 controls operation of the key operation unit 1 and the display 3 such as a liquid crystal display (LCD), etc. to transmit key information from the key operation unit 1 to the master CPU 4 or to drive the display 3 to display the key information. The master CPU 4, which is connected with the slave CPU 2, the EPROM 5, the EEPROM 6, the buffer 7 and the external circuit connecting unit 8, controls main operation of the apparatus. The EPROM 5 is a memory for storing programs which are supplied to the master CPU 4 to carry out predetermined control sequences. The EEPROM 6 is a memory for storing the key information which corresponds to a service function such as a shortened dial call function, a calling time displaying function, etc. The buffer 7 is a memory for temporarily storing the key information which is supplied from the slave CPU 2. The external circuit connecting unit 8 connects the telephone set with an external circuit.

Figure 2:
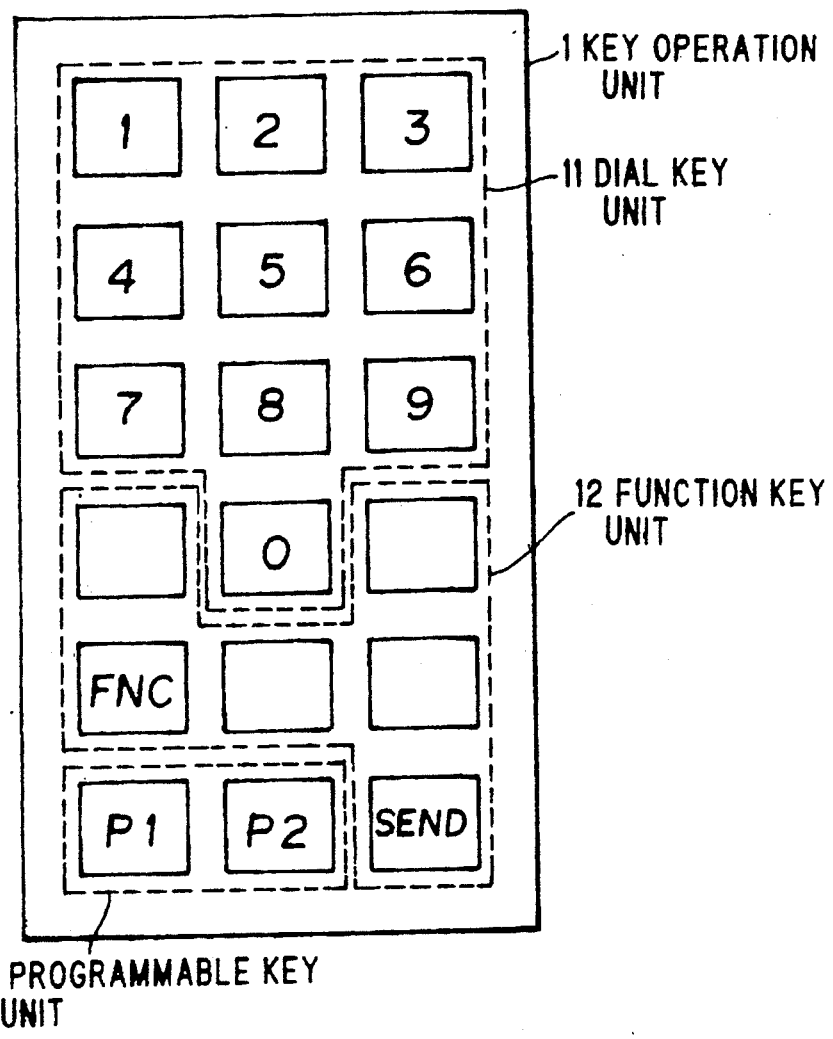
FIG. 2 is a plan view illustrating a key operation unit of the telephone set in the preferred embodiment according to the invention.

FIG. 2 is a plan view illustrating a key operation unit 1 of the telephone set in the preferred embodiment. The key operation unit 1 comprises a dial key unit 11 which includes dial keys of "0" to "9", a function key unit 12 which includes a plurality of function keys such as "FNC", "SEND", etc., and a programmable key unit 13 which includes programmable keys "P1" and "P2". In the preferred embodiment, two programmable keys P1 and P2 are provided as hardware type keys, however, programmable keys can be provided in the form of software type keys which generate programmable key signals by using, for instance, the dial and function keys.

Figure 3:
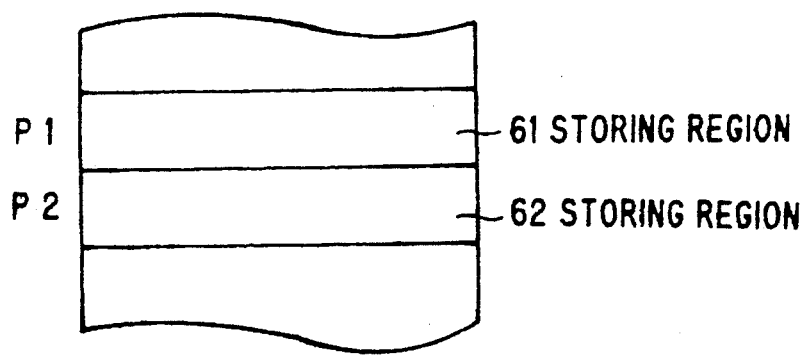
FIG. 3 is an explanatory view illustrating storing regions of an EEPROM 6 of the apparatus in the preferred embodiment according to the invention.

FIG. 3 is an explanatory view illustrating storing regions of an EEPROM 6 of the apparatus in the preferred embodiment. In this preferred embodiment, the EEPROM 6 includes two storing regions 61 and 62 corresponding to the programmable keys P1 and P2, respectively.

Figure 4:
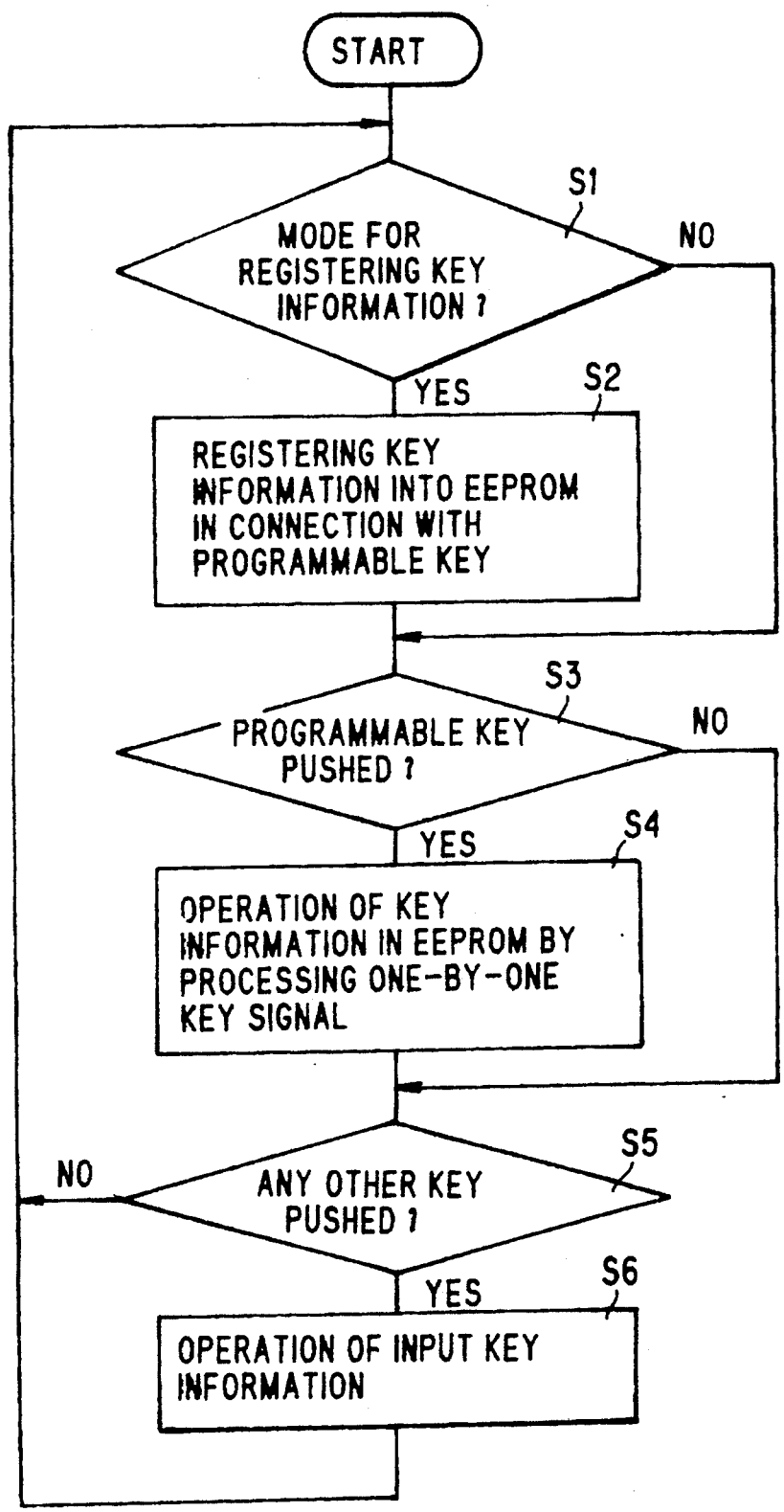
FIG. 4 is a flow chart explaining operation of a master CPU of the apparatus in the preferred embodiment according to the invention.

FIG. 4 is a flow chart explaining operation of a master CPU 4 of the apparatus in the preferred embodiment.

In operation, first, the operation of registering a service function will be explained. In a first example, it is supposed that the service function to be registered is a shortened dial call in which a phone number, for instance, "939-2312", already registered in the EEPROM 6 by a shortened dial number "98", is to be programmed. In order to register key information "9, 8, SEND" which instructs the shortened dial call operation, the keys are pushed in the order of "FNC, P1, 9, 8, SEND, P1". The first and second key signals "FNC", and "P1" provide an instruction which orders the master CPU 4 to register the key signals which follow the first and second key signals. The third to fifth key signals "9", "8", and "SEND" are information to be registered. The last key signal "P1" is a signal instructing an end of the key information registration.

When the above key information is supplied from the key operation unit 1, the slave CPU 2 receives the key information to be transmitted to the master CPU 4, and controls the display 3 to display the key information. The master CPU 4 judges the key information as an order of the registering operation by the first and second key signals of "FNC", and "P1", which corresponds to a state of "YES" in the step S1 in FIG. 4, so that the master CPU 4 carries out the registering operation which is step S2 in FIG. 4. In step S2, the master CPU 4 controls the EEPROM 6 to store the key signals of "9", "8", and "SEND" in the storing region 61. When the last key signal of "P1" is received by the master CPU 4, the registration of the key information is completed. In more detail, the key information is stored temporarily in the buffer 7, and is transferred to the storing region 61 corresponding to the programmable key P1 in EEPROM 6, when the last key signal of "P1" is received.

In a second example, it is supposed that service functions to be registered are a shortened dial call and a calling time display service. In this case, a phone number, for instance, "939-2318", is to be registered to the storing region 62 of the EEPROM 6 in correspondence with a shortened dial number "99". In order to register key information "9, 9, SEND, FNC, 1, 1" which instructs the two services in connection with the programmable key P2, the keys are pushed in the order of "FNC", "P2", "9", "9", "SEND", "FNC", "1", "1", and "P2".

When the above key information is supplied from the key operation unit 1, the slave CPU 2 receives the key information to be transmitted to the master CPU 4, and controls the display 3 to display the key information as like in the first example. The master CPU 4 judges the key information as an order of the registering operation by the first and second key signals of "FNC", and "P2", so that the master CPU 4 carries out the registering operation which is the step S2 in FIG. 4. Thus, the master CPU 4 controls the EEPROM 6 to store each key signal of "9", "9", "SEND", "FNC", "1", and "1" in the storing region 62, until the last key signal of "P2" which instructs the end of the key information is received. In this case, the key information is transferred from the buffer 7 to the EEPROM 6, as described in the first example.

Next, operation of instructing the registered service functions will be explained.

When the programmable key P1 is pushed, the master CPU 4 receives the key information of "P1" through the slave CPU 2. In the step S4, the master CPU 4 reads the corresponding key information of "9, 8, SEND" from the EEPROM 6, and the key information "9, 8, SEND" is decoded. Then, the corresponding service function which is the shortened dial call of the phone number "939-2312" is carried out in accordance with the corresponding service function program stored in the EEPROM 6.

On the other hand, when the programmable key P2 is pushed, the master CPU 4 receives the key information of "P2" through the slave CPU 2, and judges the key information as an order of the operation instructed by the programmable key P2, so that the master CPU 4 reads the key information "9, 9, SEND" and "FNC, 1, 1" to be decoded, and the corresponding service functions are operated in which the shortened dial call of the phone number "939-2318" and the calling time display service are carried out.

If any other key information is supplied by the key operation unit 1, the master CPU 4 judges as "YES" in the step S5 to carry out a key program which corresponds to the pushed key in S6, as shown in FIG. 4.

FIG. 5 is a flow chart explaining operation of the step S4 in FIG. 4.

In the step S4, when the master CPU 4 detects an input signal from a programmable key, the master CPU 4 selects the first key signal from the key information stored in the corresponding storing region of the EEPROM 6, and then sends the first key signal combined with an echo back command to the slave CPU 2 in the step S41 in FIG. 5. The slave CPU 2 which received the first key signal controls the display 3 to display the key signal, and then sends the key information back to the master CPU 4. After receiving the key information from the slave CPU 2, the master CPU 4 delivers the first key signal to a key operation program (S42), and waits for a predetermined time in order to prevent a malfunction which occurs when a series of key signals are delivered in a short time (S43). After waiting for the predetermined time, the second key signal is subject to the same operation, and following key signals are processed sequentially in the same manner.

Then, the master CPU 4 checks whether the operations of all the key signals of the read key information are finished or not (S44). If not finished, processing returns to step S41, the operation of the next key signal is carried out. If finished, the operation in step S4 is finished and the operation of the next step (not shown) will be carried out, as shown in FIG. 4. If desired, the key operation program may be carried out without returning the key signals from the slave CPU 2 to the master CPU 4.

As mentioned before, the programmable keys P1 and P2 may be replaced by a function key(s), and by a combination of function keys and dial keys if necessary. When a single function key is used for a programmable key, the number of pushing the function key is programmed to function as the programmable key.

When a programmable key is composed of function and dial keys, the number of the combined keys is preferably as small as possible.

Figure 6A:
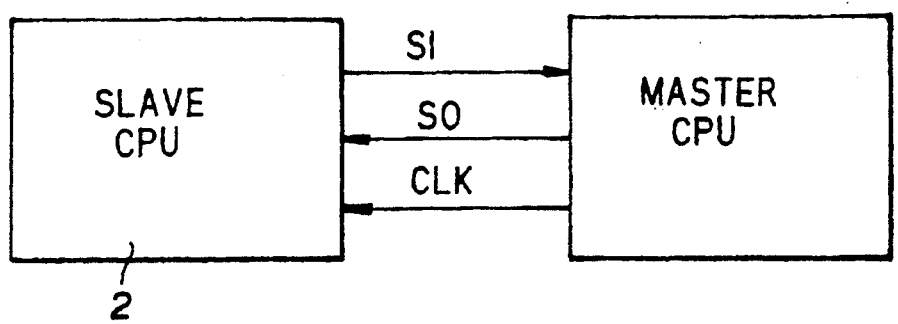

FIG. 6A shows a transmission of data between the master and slave CPU 4 and 2 in synchronous with a clock signal CLK supplied from the master CPU 4 to the slave CPU 2.

Figure 6B:
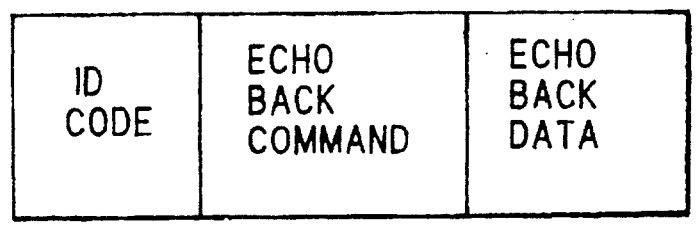
Figure 6C:
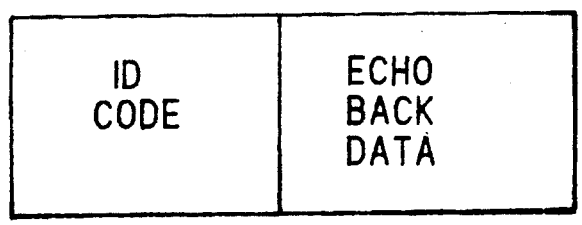

FIG. 6B shows a key signal SO of an echo-back data SO having an echo-back command and an ID code which is supplied from the master CPU 4 to the slave CPU 2, while FIG. 6C shows the echo-back data SI having an ID code which is supplied from the slave CPU 2 back to the master CPU 4.

FIG. 6D shows operation in the slave CPU 2, from which the signal supplied from the master CPU 4 is transmitted back to the master CPU 4.

In this preferred embodiment, the slave CPU 2 operates in the similar manner to the case where the slave CPU 2 receives an input signal from the key operation unit 1, when the slave CPU 2 receives the key signals having the echo-back command from the master CPU 4, so that processing of the key information stored in the EEPROM 6 is not preformed solely by the master CPU 4. Therefore, the key signals supplied from the master CPU 4 are processed by the slave CPU 2 and are displayed by the display 3 upon receiving a display command from the slave CPU 2. In the explanation of the step SI in FIG. 4, "YES" may be met, when the final key signal "P1" is acknowledged. Further, although "null code" is practically inserted between transmitting key signals during operation of the programmable key, this was not explained in the preferred embodiment.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An apparatus for driving a service function unit of a multi-function telephone set, comprising:
   a memory for storing service information generated by pushing a plurality of keys;
   at least one programmable key for reading said service information from said memory; and
   means for controlling said service function unit to be driven in accordance with said service information which is read from said memory by said programmable key,
   wherein said controlling means includes a master controlling unit for controlling main operation of said telephone set, and a slave controlling unit provided between said master controlling unit and a key operation unit having said plurality of keys and for controlling auxiliary operation of said telephone set, said service information being supplied from said master controlling unit to said slave controlling unit together with an echo-back command, said slave controlling unit processes said service information simultaneously with the returning of said service information to said master controlling unit.

2. An apparatus for driving a service function unit of a multi-function telephone set, according to claim 1, wherein:
   said plurality of keys are selected from dial keys, function keys, and said at least one programmable key.

3. An apparatus for driving a service function unit of a multi-function telephone set, according to claim 1, further comprising:
   a display unit connected to said slave controlling unit;
   wherein said controlling unit controles said display unit to display information in accordance with said service information.

4. An apparatus for driving a service function unit of a multi-function telephone set, comprising:
   a key operation unit including dial keys of 0 to 9, a predetermined number of function keys, and at least one programmable key;
   means for judging an operation mode selected from a registering mode, a program operation mode and an ordinary operation mode in accordance with key information generated by said keys which are pushed one by one, said registering mode being a mode in which key information input through said key operation unit and indicating one of a plurality of service functions to be performed is registered, said plurality of service functions including service functions other than automatic dialing functions, said program operation mode being a mode in which a service function corresponding to said key information which has been registered is carried out, and said ordinary operation mode being a mode in which a service function corresponding to non-registered key information is carried out;
   a non-volatile memory for registering said key information;
   means for writing said key information to said non-volatile memory;
   means for reading said key information registered in said non-volatile memory;
   a decoder for decoding said key information to produce operation data to operate a corresponding service function program;
   wherein said judging means sends said key information to said writing means for registration to said non-volatile memory in said registering mode, said reading means reads said key information from said non-volatile memory in said program operation mode, and said decoder decodes said key information to carry out a programmed service function.

5. An apparatus for driving a service function unit of a multi-function telephone set, according to claim 4, wherein said at least one programmable key is a hardware type key provided additionally to said dial and function keys in said key operation unit.

6. An apparatus for driving a service function unit of a multi-function telephone set, according to claim 4, wherein said at least one programmable key is composed by a combination of said dial said function keys provided in said key operation unit.

7. An apparatus for driving a service function unit of a multi-function telephone set, according to claim 4, wherein said at least one programmable key is composed by a combination of said dial keys provided in said key operation unit.

8. An apparatus for driving a service function unit of a multi-function telephone set, according to claim 4, wherein said at least one programmable key is composed by a combination of said function keys provided in said key operation unit.

UNITED STATES PATENT AND TRADEMARK OFFICE
CERTIFICATE OF CORRECTION

PATENT NO. : 5,206,904
DATED : April 27, 1993
INVENTOR(S) : Noriko KOMA

It is certified that error appears in the above-identified patent and that said Letters Patent is hereby corrected as shown below:

Col. 6, line 53, after "said dial", insert --and--.

Signed and Sealed this

Eighth Day of March, 1994

*Attest:*

BRUCE LEHMAN

*Attesting Officer*     *Commissioner of Patents and Trademarks*